United States Patent

[11] 3,595,150

| [72] | Inventor | Dieter Engelsmann |
| | | Unterhaching, Germany |
| [21] | Appl. No. | 808,447 |
| [22] | Filed | Mar. 19, 1969 |
| [45] | Patented | July 27, 1971 |
| [73] | Assignee | AGFA-Gevaert Aktiengesellschaft |
| | | Leverkusen, Germany |
| [32] | Priority | Mar. 26, 1968 |
| [33] | | Germany |
| [31] | | A 29 521 |

[54] FILM MAGAZINE LOCATING MEANS
10 Claims, 1 Drawing Fig.

[52] U.S. Cl. ................................................ 95/31 CA
[51] Int. Cl. ...................................................... G03b 17/26,
 G03b 17/28
[50] Field of Search........................................... 95/31, 11;
 242/71, 71.1, 71.3

[56] References Cited
UNITED STATES PATENTS

| 3,347,142 | 10/1967 | Steisslinger.................. | 95/31 |
| 3,247,773 | 4/1966 | Doblin......................... | 95/31 |
| 3,490,350 | 1/1970 | Hardies et al................. | 95/31 |

*Primary Examiner*—Samuel S. Matthews
*Assistant Examiner*—Russell E. Adams, Jr.
*Attorney*—Michael S. Striker ABSTRACT: A magazine for photographic film is provided with two spaced-parallel external walls which define a groove serving to receive, with certain clearance, an elongated rib provided in the chamber of the camera housing. Such clearance is reduced, when the magazine is fully inserted into the chamber, by one or more projections which are provided on the rib and engage the adjoining wall or walls of the magazine. The projection or projections ensure that the claws of the rotary coupling member of the film-transporting mechanism in the housing properly engage the claws on the takeup reel of the magazine which is accommodated in the chamber.

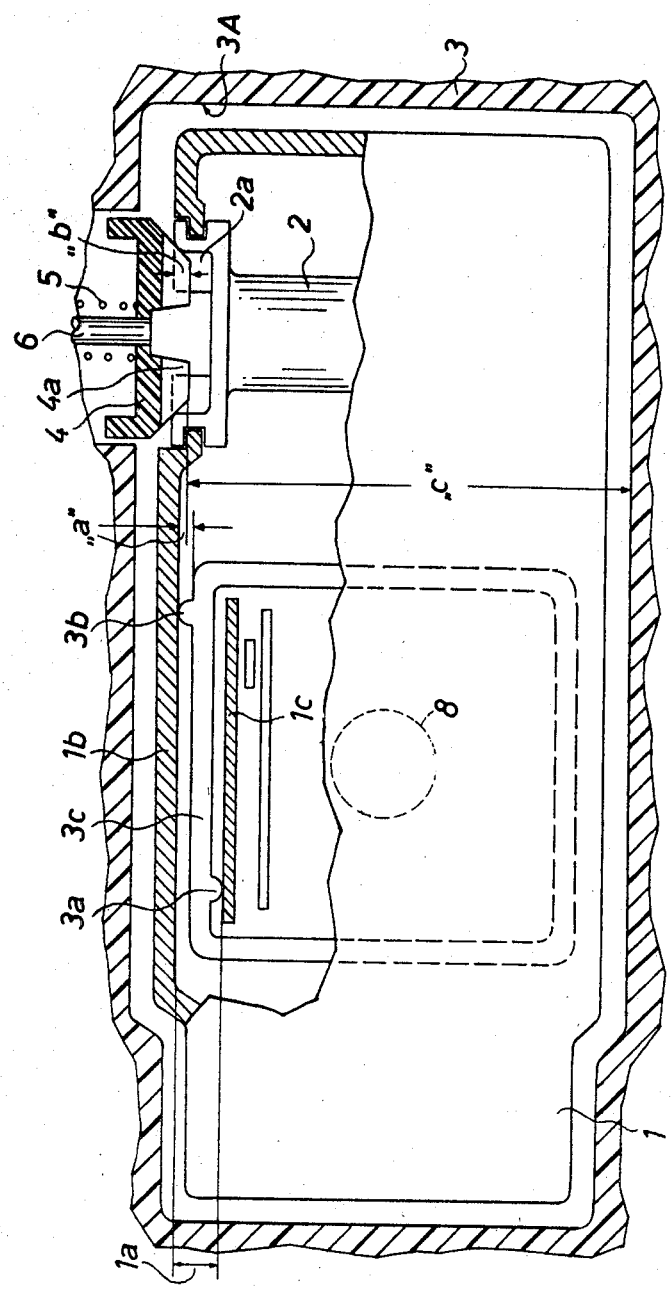

3,595,150

FILM MAGAZINE LOCATING MEANS

BACKGROUND OF THE INVENTION

The present invention relates to photographic apparatus in general, and more particularly to improvements in still cameras or motion picture cameras which utilize magazines for photographic film.

It is already known to provide a magazine for photographic film with a groove or channel which receives a rib provided in the housing of the camera and extending with clearance into the groove when the magazine is properly accommodated in the internal chamber of the housing. Some clearance is needed in order to compensate for manufacturing tolerances and for expansion or contraction in response to temperature changes. Excessive clearance is undesirable because it might interfere with the transport of film in the magazine. The film-transporting mechanism of a camera which employs magazines normally comprises a rotary coupling member whose claws are biased into engagement with the claws of a complementary coupling member on the takeup reel of the magazine. If the magazine is free to tilt, the claws of the coupling member in the film-transporting mechanism of the camera are unable to transport the film or the two coupling members cannot be placed in proper engagement with each other during insertion of the magazine.

SUMMARY OF THE INVENTION

An object of my invention is to provide a photographic apparatus, such as a still camera or a motion picture camera, which employs magazines containing photographic film and wherein the magazine can be readily inserted into or withdrawn from the chamber of the camera housing but is properly located in inserted position so that the foremost unexposed film frame is in an optimum position with reference to the objective. An additional object of the invention is to provide a camera wherein the film-transporting mechanism does not jam and is capable of properly transporting the film with minimal wear on its parts despite the fact that the aforementioned groove or channel accommodates the rib with substantial clearance.

Another object of the invention is to provide a novel housing for cameras of the above-outlined character.

A further object of the invention is to provide the housing and the magazine with simple, inexpensive, accurate and compact guide means which insure proper orientation of the magazine in the housing and prevent uncontrolled movements of the magazine with reference to the objective and/or with reference to the film-transporting mechanism.

The invention is embodied in a photographic camera which comprises a housing defining an internal chamber, a film-containing magazine removably accommodated in the chamber, a first guide portion defining an elongated groove, a second guide portion including an elongated rib, one of the guide portions being provided on the housing in the chamber and the other guide portion being provided on the magazine with the rib extending into the groove of the first guide portion to locate the magazine in the chamber with limited clearance, and a projection provided on one of the guide portions and abutting against the other guide portion in the groove to reduce the clearance.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary sectional view of the housing of a camera, the magazine being shown in inserted position and partly broken away.

DESCRIPTION OF THE PREFERRED EMBODIMENTS

Referring to the drawing in detail, there is shown the housing 3 of a photographic apparatus which can constitute a still camera or a motion picture camera. The housing 3 defines an internal chamber 3A which is accessible through a pivotable or detachable door (not shown) and accommodates a removable film magazine or cassette 1. The interior of the magazine includes a left-hand compartment which contains a supply of unexposed photographic film (not shown) and a right-hand compartment which accommodates a film-collecting reel or takeup reel 2. The front side of the magazine 1 (namely, that side which faces away from the observer) is provided with a window large enough to expose a film frame so that such frame can be exposed to scene light which is admitted by way of an objective 8. The upper portion of the reel 2 is provided with a coupling member 2a which can be engaged and rotated by a complementary coupling member 4 having a stem 6 and forming part of the film-transporting mechanism in the camera. A spring 5 biases the coupling member 4 in the axial direction of the stem 6 so that the claws 4a of the coupling member 4 engage with complementary claws of the coupling member 2a. The extent to which the two sets of claws overlap is shown at b. This distance b should not be reduced below a predetermined minimum value because the claw 4 is then likely to become disengaged from the claw 2a and is unable to rotate the reel 2 upon completion of an exposure.

The housing 3 is provided with a male guide portion which includes an elongated straight rib 3c preferably making an oblique angle with the axis of the reel 2. In other words, when the camera is held in normal position in which the axis of the reel 2 is vertical, the rib 3c is preferably inclined with reference to a horizontal plane. This rib extends into the chamber 3A and is received with a predetermined clearance in the groove of an elongated female guide portion provided on the magazine 1 and including two substantially parallel walls 1b, 1c. The width of the groove between the walls 1b, 1c of the female guide portion is shown at 1a; this width exceeds the width of the rib 3c by approximately twice the distance a which corresponds to the height of a rounded projection 3b provided on the rib 3c and extending upwardly (when the camera is held in normal position) so as to abut against the underside of the upper wall 1b. The projection 3b is preferably adjacent to the reel 2, i.e., it may be provided at or close to the right-hand end of the rib 3c. A second rounded projection 3a is provided at the underside of the rib 3c and extends across the lower part of the groove into abutment with the lower wall 1c.

The reason for making the groove between the walls 1b, 1c wider than the width of the rib 3c is that the magazine 1 and/or the housing 3 might not be finished with a high degree of precision. Such lack of precision is compensated for by the difference (two times a) between the width of the rib 3c and the width 1a of the groove. The extent of overlap between the claws of the coupling members 2a, 4a (namely the distance b) is satisfactory when the rib 3c is located substantially midway between the walls 1b, 1c. In the absence of the projection 3a and/or 3b, the magazine 1 would be free to wobble or tilt in the chamber 3A, especially because the claws 4a of the coupling member 4 are biased downwardly by the spring 5. Such bias of the spring 5 tends to reduce the distance b below the indicated value. Excessive tiling of the magazine 1 in the chamber 3A would result in improper positioning of the foremost unexposed film frame with reference to the objective 8 and, as mentioned above, such tilting could interfere with transmission of torque between the coupling member 4 and reel 2. On the other hand, the extent to which the coupling member 4 projects into the chamber 3A cannot be increased at will because this would impede proper engagement between the claws of the two coupling members. As shown, the distance $c$ between the lower end faces of claws $4a$ on the coupling member 4 and the bottom surface in the chamber 3A of the housing 3 must be selected in such a way that the underside of the magazine 1 remains spaced from such bottom surface when the magazine is properly installed in the housing. This is achieved by the provision of the aforementioned projection $3b$. Such projection ensures that the distance $b$ does not deviate excessively from a predetermined optimum value. Proper positioning of the magazine can be ensured by selecting the height of the projection $3b$ in such a way that it equals or approximates the distance $a$ which corresponds to one-half the difference between the width of the rib $3c$ and the width $1a$ of the groove between the walls $1b$, $1c$. The projection $3b$ thus reduces in half the clearance between the walls $1b$, $1c$ and rib $3c$ without materially interfering with insertion or removal of the magazine from the chamber 3A. The projection $3b$ constitutes a fulcrum on which the wall $1b$ pivots until it assumes a position in which the overlap between the claws of the coupling members $2a$, 4 equals or approximates the value $b$. The other projection $3a$ (which is preferably remote from the projection $3b$, as considered in the longitudinal direction of the rib $3c$) serves to further reduce the freedom of pivotal movement of the magazine 1 in the chamber 3A, namely, to prevent the spring 5 from tilting the upper wall $1b$ in a clockwise direction, as viewed in the drawing. It will be noted that the projections $3b$, $3a$ are located in the groove of a properly inserted magazine and that they extend from opposite sides of the rib $3c$. The height of the projection $3a$ preferably equals or approximates the height $a$ of the projection $3b$. It was found that a rib with two longitudinally spaced projections does not interfere with insertion of the magazine 1 into the chamber 3A.

If desired, the projection $3b$ can be provided at the underside of the rib $1b$ and/or the projection $3a$ can be provided at the upper side of the wall $1c$. It is equally possible to provide the rib on the magazine and to provide the housing 3 with a female guide portion having two walls which correspond to walls $1b$, $1c$.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What I claim as new and desired to be protected by Letters Patent is set forth in the appended claims:

1. In a photographic camera, a combination comprising a housing having a chamber; a film-containing magazine removably accommodated in said chamber; a first guide portion having two walls defining therebetween an elongated groove; a second guide portion including an elongated rib, one of said guide portions being provided on said housing and the other guide portion being provided on said magazine and said rib extending with clearance into said groove to locate said magazine in said chamber with limited clearance; and a projection provided on one of said guide portions and abutting against the other guide portion in said groove to reduce said clearance.

2. A combination as defined in claim 1, further comprising a second projection provided on one of said guide portions and abutting against the other guide portion in said groove to further reduce said clearance.

3. A combination as defined in claim 1, further comprising a film-collecting reel rotatably mounted in said magazine and having a first coupling member accessible from the exterior of said magazine, and a complementary second coupling member rotatably mounted in said housing and engaging with said first coupling member so that said reel is rotated in response to rotation of said second coupling member.

4. A combination as defined in claim 3, wherein the guide portion which is provided with said projection has a first end nearer to and a second end more distant from said reel, said projection being nearer to the first than to the second end of said last-mentioned guide portion.

5. A combination as defined in claim 3, wherein said rib makes an oblique angle with the axis of said reel.

6. A combination as defined in claim 4, wherein said second guide portion is provided on said housing and wherein said projection is provided on said rib.

7. A combination as defined in claim 6, wherein said projection extends upwardly in the normal position of the camera.

8. A combination as defined in claim 1, further comprising a second projection provided on one of said guide portions and abutting against the other guide portion in said groove, said projections being remote from each other as considered in the longitudinal direction of said rib.

9. In a photographic camera, a combination comprising a housing having a chamber; a film-containing magazine removably accommodated in said chamber; a first guide portion having two walls defining therebetween an elongated groove; a second guide portion including an elongated rib, one of said guide portions being provided on said housing adjacent to said magazine, said rib extending with clearance into said groove to locate said magazine in said chamber with limited clearance; a first projection provided on one of said guide portions and abutting against the other guide portion in said groove to reduce said clearance; and a second projection provided on one of said guide portions and abutting against the other guide portion in said groove to further reduce said clearance; said projections being located at the opposite sides of said rib.

10. In a photographic camera, a combination comprising a housing having a chamber; a film-containing magazine removably accommodated in said chamber; a first guide portion having two walls defining therebetween an elongated groove; a second guide portion including an elongated rib, one of said guide portions being provided on said housing adjacent to said chamber and the other guide portion being provided on said magazine, said rib extending with clearance into said groove to locate said magazine in said chamber with limited clearance; and a projection provided on one of said guide portions and abutting against the other guide portion in said groove to reduce said clearance, the height of said projection approximating half the difference between the width of said groove and the width of said rib.